Sept. 5, 1967 W. L. DEEG 3,340,511

ALLOTTING SYSTEM USING PLURAL WINDING MAGNETIC FLUX LOGIC

Filed July 3, 1963 4 Sheets-Sheet 1

INVENTOR.
Wyman L. Deeg
BY
Mason, Kolehmainen, Rathburn & Wyss ATTYS.

INVENTOR.
Wyman L. Deeg
BY
Mason, Kolehmainen, Rathburn & Wyss
ATTYS.

INVENTOR
Wyman L. Deeg
BY
Mason, Kolehmainen, Rathburn & Wyss
ATTYS.

Sept. 5, 1967 W. L. DEEG 3,340,511

ALLOTTING SYSTEM USING PLURAL WINDING MAGNETIC FLUX LOGIC

Filed July 3, 1963 4 Sheets-Sheet 4

INVENTOR.
Wyman L. Deeg.
BY
Mason, Kolehmainen, Rathburn & Wyss
ATTYS.

United States Patent Office 3,340,511
Patented Sept. 5, 1967

3,340,511
ALLOTTING SYSTEM USING PLURAL WINDING MAGNETIC FLUX LOGIC

Wyman L. Deeg, Glenview, Ill., assignor to C. P. Clare & Company, Chicago, Ill., a corporation of Delaware
Filed July 3, 1963, Ser. No. 292,644
10 Claims. (Cl. 340—172.5)

This invention relates to a data handling system and, more particularly, to a system for receiving and translating digital data.

The copending application of Wyman L. Deeg, Ser. No. 210,119, filed July 16, 1962, now Patent No. 3,244, 942, describes a number of control modules using magnetic flux logic to perform many of the basic operations used in data handling systems, such as counting and bit storage. These control modules as well as the flux lagic technique have opened the way to the development of systems in which many of the data handling functions can be performed by improved circuits of simpler and more reliable design.

Accordingly, one object of the present invention is to provide a new and improved data handling system.

Another object is to provide a data handling system including new and improved means for assigning data handling units for use on the basis of their busy or idle condition.

Another object is to provide a switching system including allotting means embodying novel busy marking means.

A further object is to provide a switching system including an allotting means using plural widing magnetic flux logic elements for controlling the availability of a plurality of data utilizing components.

Another object is to provide a data handling system including new and improved means for receiving and translating data.

Another object is to provide a data handling system including a matrix of magnetic switch means and new and improved means for storing data in the matrix.

A further object is to provide a data handling system using a storage matrix of magnetic switch means to check the accuracy of data transmission.

In accordance with these and many other objects, an embodiment of the invention comprises a plurality of separate data receiving, translating, and storing units which are individually assigned to calling ones of a plurality of lines or signal sources under the control of an allotter. A plurality of connecting means interposed between the input lines and the data handling units are selectively assigned for operation by the allotting means on the basis of their idle or busy condition. The allotting means includes a ring counter for sequentially energizing one of a pair of windings in each of a plurality of magnetic switch units, each of which is individual to the group of connecting means for one of the data handling units. The allotting means prepares the selected group of connectors for operation, and a connection is completed under the control of a signal supplied by the calling line or signal source. Whenever one of the groups of connecting means is placed in use to connect its related data handling unit to one of the input lines, a signal is returned to the other winding of the related magnetic switch means, and this winding is maintained energized during the period of use of the related data handling unit. Thus, during continuing cyclic operation of the ring counter, the magnetic switch means in which one winding is energized by a related connector means are marked as busy to prevent an attempt to seize the related data handling unit.

When the connecting means is operated, the signals from a calling line are supplied to the related idle one of the data handling units. Each of these units comprises a magnetic storage matrix composed of sealed magnetic switch units whose operating windings are arranged in a conventional two-coordinate matrix having first and second coordinate inputs. A first counting means is connected to the first coordinate input, and a second counter is connected to the second coordinate input. The incoming signal supplied by the signal source comprises three identical series of signals representing the same plural digit word. When the first series is applied to the data handling unit, the first counting means is operated to a setting representing the value of the first digit to operate the magnetic switch in a particular crosspoint of the matrix representing the value of the first received digit. A timing circuit responsive to a control signal interposed between successive groups of digit representing pulses resets the first counting means and operates the second counting means to advance a single step in the interval following the first series of digit representing pulses. Thus, when the next series of pulses is received, the first counting means is again operated to a value representing the second received digit, and the value of this digit is again stored in the matrix by the closure of a selected crosspoint. This operation continues until such time as all of the digits in the word have been received.

An additional timing circuit in the control for the data handling unit responds to an end-of-word signal in the message to reset the first and second counting means to their normal positions. The second transmission of the same plural digit word is then stored in the matrix in the same manner as the first transmission. The crosspoints in the magnetic storage matrix can be used to control a visual indicating means to permit the results of the first and second transmissions to be compared to determine whether the message has been accurately transmitted. At the end of the second transmission, a counter in the control circuit is advanced to direct the third identical transmission of the word to a recorder. At the end of the third transmission and the recording of the plural digit word, the data handling unit is restored to a normal condition, the connecting means is released, and the related magnetic switch in the allotter is restored to a condition representing the idle state of the connected data handling unit.

Many other objects and advatanges of the present invention will become apparent from considering the following detailed description in conjunction with the drawings, in which.

Figure 1:
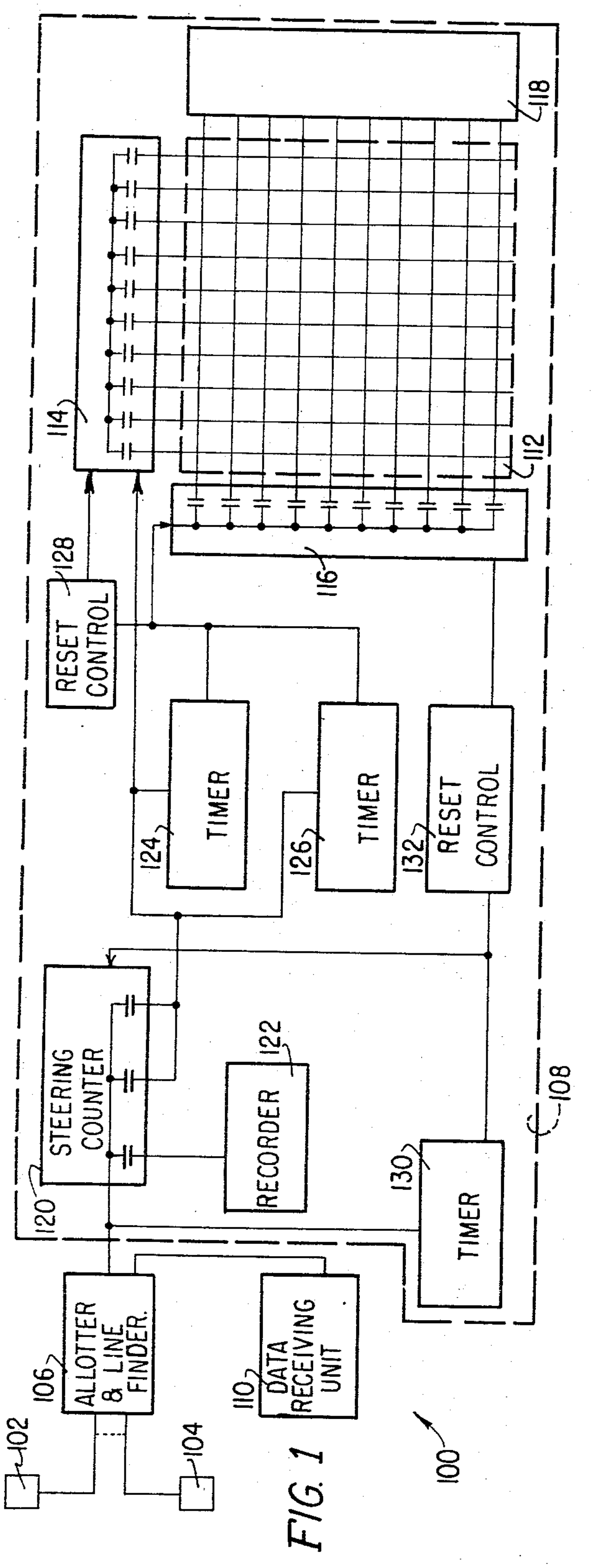
FIG. 1 is a block diagram of a system embodying the present invention.
Figure 5:
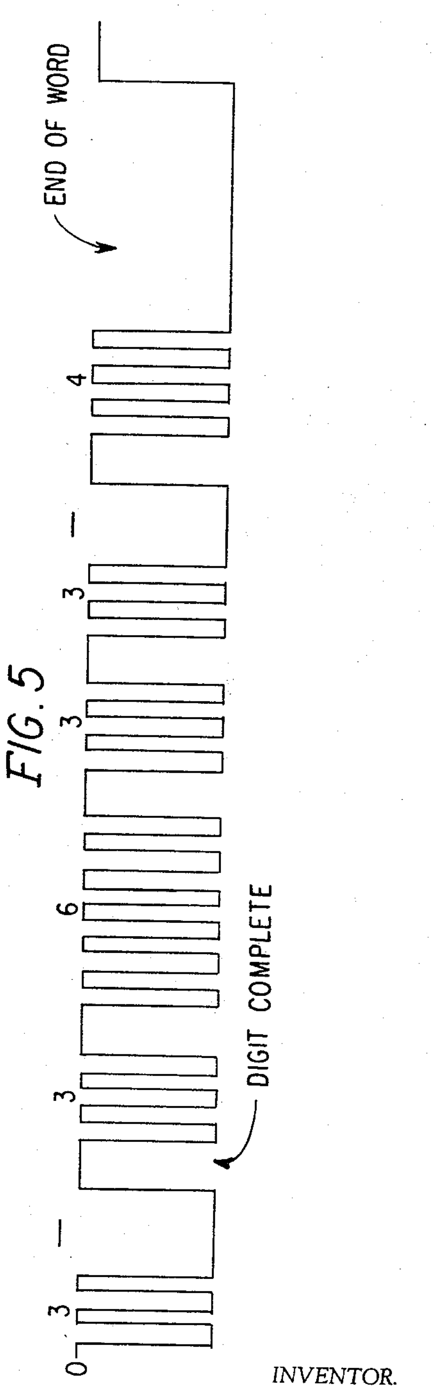
Figure 3:
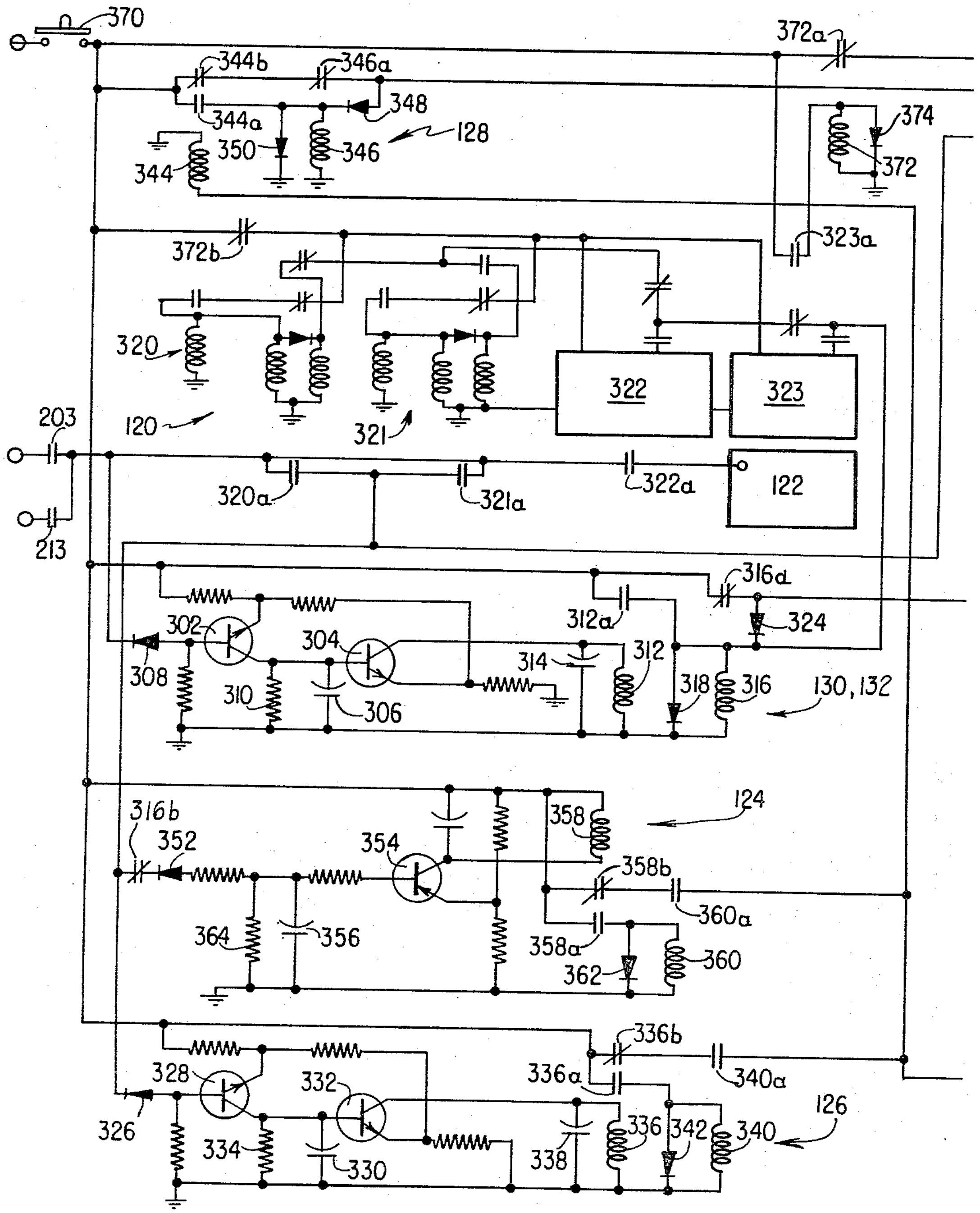
Figure 4:
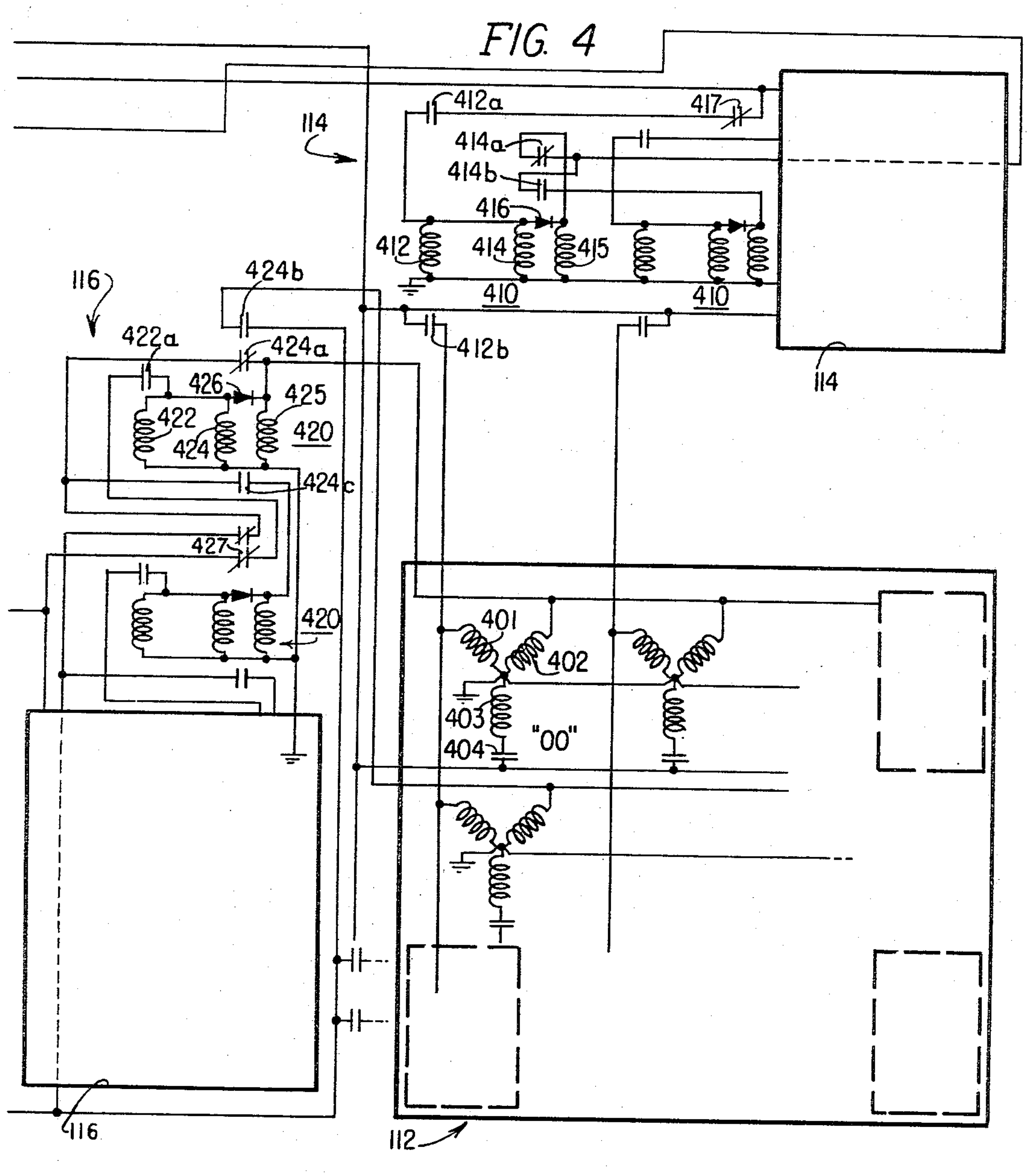
Figure 6:
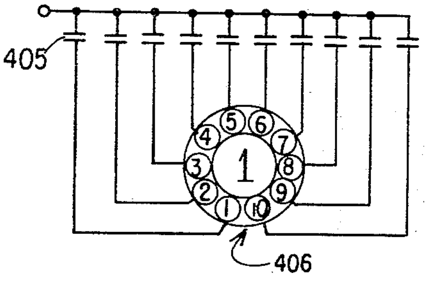

FIGS. 3 and 4 form a schematic diagram of a data receiving and storing unit included in the system shown in FIG. 1;

FIG. 5 is a schematic diagram illustrating the waveform of a typical message received by the system shown in FIG. 1; and FIG. 6 is a schematic diagram of a visual indicator included in the system.

Referring now more specifically to FIG. 1 of the drawings, therein is illustrated a data handling system which embodies the invention and which is indicated generally as 100. The system 100 includes a plurality of data or signal sources or input lines 102, 104 which can provide transmitted data in a variety of forms. In the system 100, the data is shown as provided in the form of a series of spaced negative-going pulses (FIG. 5) representing the digits of the designation of a fire alarm box. The transmitted message also includes pulses or signals of varying widths representing control information, such as a dash or a digit complete code. The message transmitted by each of the sources 102, 104 comprises four identical transmissions of a plural digit word identifying the alarm box.

The signaling sources 102, 104 are connected to the input of an allotter and line finder 106 which operates to connect a calling one of the lines or sources 102, 104 to an idle one of a plurality of data receiving and storing units 108, 110. To accomplish this, the circuit 106 includes novel means in the allotter and in the connecting portion thereof for preventing the association of a calling line with a busy one of the data units 108, 110.

The units 108 and 110 are basically identical and comprise a coordinate matrix 112 formed by a plurality of pairs of sealed magnetic switches, each of which is provided with a pair of operating windings and a holding winding. The operating windings are selectively connected in a two coordinate input matrix having a plurality of first coordinate inputs connected to the output of a first counter 114 and a plurality of second coordinate inputs connected to a second counter 116. The magnetic switches forming the crosspoints of the matrix 112 are selectively closed by the concurrent energization of both of the operating windings. In response to the closure of one of the crosspoints, the holding winding is energized to maintain the switch crosspoint in a closed condition regardless of the state of the input signal, and a signal is forwarded to a display or indicating means 118 to provide a representation of the data stored in the matrix 112.

The first of the four transmissions from a calling one of the signal sources 102, 104 is dissipated during the connection of the calling signal sources 102, 104 to one of the data handling units, such as the unit 102. Thus, only the second and following transmission of the plural digit word are forwarded in full through the allotter and line finder 106 to the input of a three-step counter 120 which directs the received impulses to either the control means for the magnetic memory matrix 112 or a recorder 122. The first train of pulses received from the calling source 102, i.e., the second series transmitted, is forwarded through the three-step counter 120 to be applied to an advance input of the counter 114 and also to the input of a pair of timing circuits 124 and 126. These pulses advance the counter 114 to a setting representing the value of the first received digit so as to enable a corresponding column of operating windings in the matrix 112. The counter 116 is normally set in its first position to enable the other set of operating windings in the first horizontal row. Accordingly, only the pair of magnetic switches in the first row representing the value of the received digit has both of its windings concurrently energized and is closed. One of the closed switches produces an indication in the display means 118, and the other switch completes a holding circuit for the closed crosspoint.

Each digit representing series of pulses supplied by the source 102 is followed by a control or off-time signal of a longer interval. The additional duration of this signal is detected by the timer 124 which operates to trigger a reset circuit 128 to restore the counter 114 to its normal position. The timer 124 also supplies a matrix set signal to the matrix 112 to operate the crosspoint selected by the counter 114 and an advance signal to the counter 116 to advance it to its next position in which the first row of the storage matrix 112 is disabled and the second row thereof is enabled. The unit 108 is now conditioned to receive the second digit of information. Assuming that the received message is of the type illustrated in FIG. 5, the second data item transmitted is a dash "—" which consists of a long period during which negative signaling potential is applied to the input line by the data source 102. This long interval of negative potential is detected by the timer 126 which operates to again trigger the reset control 128 to restore the counter 114 to its normal condition. Further, the timer 126 forwards an advance pulse to the counting circuit 116 so that this counter is advanced an additional step to disable the second row and to enable the third row of the matrix 112. Thus, digits can be stored in any level of the matrix 112 in dependence on the receiving control and digital information. The remainder of the digits of the word transmitted by the source 102 are stored in the matrix 112 under the control of the counters 114 and 116 in the manner described above.

At the end of the transmission of the complete plural digit word, and end-of-word or message signal comprising a long period of negative potential is supplied to the signaling line and is detected by a timer 130. This timer provides an output pulse to both the three-step counter 120 and a reset control 132. The counter 120 is advanced a single step to its second position in which the input signals remain connected to the timers 124 and 126 and the counter 114 in the same manner as before, The operating signal suplied to the reset control 132 operates this circuit to reset the second counter 116 to its normal position. The resetting of the counters 114 and 116 does not disturb the storage of the information in the matrix 112 or the display provided by the indicating means 118 under the control of the matrix 112. The signaling source 102 now supplies another transmission of the identical message or word which is stored in the magnetic storage matrix 112 a second time. If an error in transmission has occurred so that the second and third transmissions from the data source 102 are not identical, identical entries are not stored in the matrix 112, and the display means 118 provides an indication of the different values of the received word. Thus, an indication is provided that the received data is not correct and that an attempt should be made to obtain a correct transmission. Alternatively, if only a single display is provided by the indicating means 118, an indication is provided that both received transmissions are identical. At the end of the third transmission of the word or the second received by the data unit 108, the timer 130 again operates the reset control 132 to restore the counter 116 and advances the counter 120 to its third position in which the signals from the data source are directed to the recorder 122. Thus, the fourth series of signals transmitted from the source 102 are recorded by the recorder 122. Following this recording operation, the termination of transmission from the data source 102 releases the allotter selection circuit to allow any subsequent call to be assigned to another data receiving unit 110. The unit 108 previously used can be manually or automatically reset. In being reset, the components therein are restored to a normal condition, and the matrix 112 is returned to a clear condition for receiving additional information.

*Allotter and line finder 106*

Figure 2:
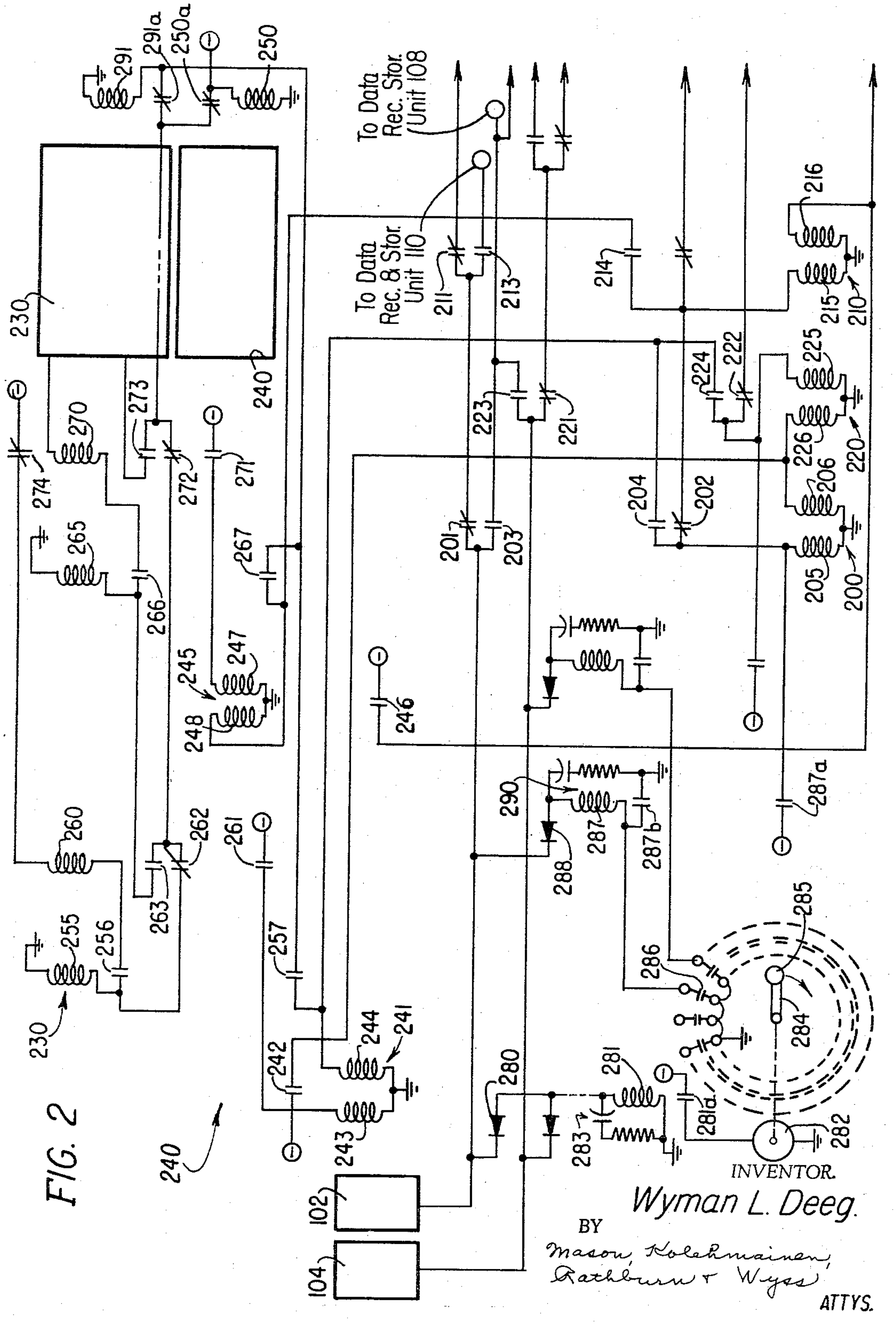
FIG. 2 is a schematic diagram of a line finder and allotter included in the system shown in FIG. 1.

The allotter and line finder 106 is illustrated in FIG. 2 of the drawings. In general, the circuit 106 includes a connecting means for connecting each of the incoming lines or signal sources 102, 104 to an idle one of the plurality of data handling units 108, 110. These connecting means are provided by a plurality of magnetic switches, such as a switch 200, which each include four sealed magnetic reed switches providing two pairs of normally closed contacts 201 and 202 and two pairs of normally open contacts 203 and 204. The switch means 200 also includes two operating windings 205 and 206 each of which provides half of the flux necessary to operate the four sealed reed switches forming the contacts 201–204. A sealed magnetic switch assembly or means similar to the means 200 is provided for connecting each of the signal sources 102, 104 to each of the plurality of data receiving units 108 and 110. In FIG. 2, the switching means 200 and a switching means 220 are used, respectively, to connect the signal sources 102 and 104 to the data receiving and storage unit 108 while the switch means 200 and a switch means 210 are used, respectively, to connect the data source 102 to the data handling units 108 and 110. Thus, the switch means are aranged in vertical columns equal in number to the number of available signal sources and in horizontal rows in number equal to the number of data receiving and storage units 108, 110.

Idle ones of the data receiving units 108, 110 are preassigned or are preallotted for use by the next calling line or signal source 102, 104 by an allotting means including a ring counter 230 having a number of counting stages equal to the number of data handling units. The counter 230 can be of the type illustrated or of the same circuit arrangement as the counters 114 and 116. As the counter 230 is advanced, a plurality of magnetic switch means indicated generally as 240 either permit or prevent the allocation of the data handling unit represented by the particular setting of the counting ring 230 in dependence on the idle or busy condition thereof. Each of the magnetic switches, such as the two illustrated switches 241 and 245 associated with the first two stages of the counter 230, preferably comprises a single-side-stable mercury switch having a pair of normally open contacts 242 or 246 and a pair of operating windings 243, 244 or 247, 248. The bias in each of the switches 241 and 245 is such that the energization of either of the windings 243 or 247 closes the associated contact 242 or 246. On the other hand, the energization of either of the windings 244 and 248 provides a flux opposing that developed by the energization of the windings 243 and 247 and positively prevents the closure of the associated contacts 242 and 246 regardless of the presence or absence of a current flow through the windings 243 or 247.

In the normal condition of the allotter and line finder circuit 106, the ring counter 230 and the magnetic control switches 240 operate to preallot an idle one of the data receiving and storage units 108, 110 for use by the next incoming call. More specifically, when the system is first placed in operation and power in the form of a grounded negative 48 volt potential source is connected to the system, a negative operating signal is supplied to the ring counter 230 through a pair of normally closed contacts 250*a* on a mercury switch including an operating winding 250. This operating signal is forwarded through the successive stages of the counter 230 through a plurality of normally closed contacts, such as two pairs of contacts 272 and 262, to be applied to the operating winding 255 of a switch including two reed switch capsules providing two normally open pairs of contacts 256 and 257. The energization of the winding 255 closes the contacts 256 and 257. The closure of the contacts 257 does not perform any useful function at this time, but the closure of the contacts 256 connects the winding 255 in series with the winding 260 of another relay and the potential source through a pair of normally closed contacts 274. Since both terminals of the winding 260 are connected to negative potential, the switch controlled thereby does not operate at this time. The switch controlled by the winding 260 includes four sealed switch units providing two normally open pairs of contacts 261 and 263 and two normally closed pairs of contacts of which only one, 262, is illustrated. The other pair of normally closed contacts provides a holding circuit for the last stage in the ring counter 230 which is not illustrated in detail.

The negative potential applied to the normally closed contacts 250*a* is also applied to the winding 250 of this relay so that after the operate interval of this switch, the contacts 250*a* are opened to interrupt the above-described energizing circuit for the winding 255. The removal of negative potential permits the windings 255 and 260 to be energized in series with each other over the circuit including the closed contacts 274 and 256. When the winding 260 is energized, the contacts 261 and 263 are closed and the contacts 262 as well as the holding circuit for the preceding stage in the ring counter 230 are opened. This releases or resets the preceding stage in the ring counter 230. The opening of the contacts 262 coupled with the closure of the contacts 263 prepares an operating circuit for the next stage in the counter 230. The closure of the contacts 261 completes an obvious energizing circuit for the winding 243 of the magnetic switch 241 so that this switch operates to close the contacts 242. The closure of the contacts 242 forwards negative potential to the allotter controlled windings in all of the set of connecting relays, 200, 220, etc., which are adapted to connect one of the incoming signal sources 102, 104 to the data receiving and storage unit 108. Thus, the windings 206 and 226 as well as the corresponding windings in the remaining connecting relays are energized to provide half of the flux necessary for operating these switches. The data receiving and storage unit 108 has now been preallotted or preassigned for use by the first calling one of the input signal sources 102, 104. The system 100 remains in this condition until such time as the first request for a data handling unit is received.

Assuming data is to be transmitted from the source 102 and that the message to be transmitted comprises the designation of a fire alarm box, such as "3–3633–4" (FIG. 5), the data source 102 applies four identical trains or series of negative-going pulses to the signaling line representing four duplicate transmissions of the data. The first transmission of the information is used to control the operation of the allotter and line finder 106 and the remaining three transmissions are used in the selected data handling unit. Thus, when negative pulsing is first supplied to the line of the data source 102, these pulses are forwarded through a diode 280 individual to the calling data source 102 to complete an operating circuit for a motor control relay including an operating winding 281 and a pair of normally open contacts 281*a*. When the winding 281 is energized, the contacts 281*a* are closed to complete an energizing circuit for a motor 282. A time delay circuit 283 shunted across the winding 281 prevents the release of the contacts 281*a* during pulsing.

When the motor 282 is placed in operation, a rotor 284 carrying a permanent magnet 285 is rotated relative to a plurality of reed switches each of which provides a normally open pair of contacts connected between ground and one terminal of the winding of a line relay individual to each of the input lines or data sources. As an example, one of the sealed switches provides a pair of normally open contacts 286 that are connected to one terminal of a winding 287 the other terminal of which is connected to the data source 102 through a diode 288. A pair of reed switches are disposed in the winding 287 to provide two normally open contacts 287*a* and 287*b*. Thus, when the permanent magnet 285 is moved adjacent the reed switch providing the contacts 286, these contacts are closed to connect the lower terminal of the winding 287 to ground. The upper terminal of this winding is provided with negative-going pulses from the data source 102. Thus, the winding 287 is energized to close the contacts 287*a* and 287*b*. The closure of the contacts 287*b* connects ground directly to the lower terminal of the winding 287 so that the reed switches controlled by this winding are not released when the magnet 285 is advanced by the rotor 284 to a position adjacent another switch as the motor 285 advances through a cycle of rotation to scan all of the input lines. A time delay network 290 connected across the contacts 287*b* and the winding 287 prevents the release of the winding 287 in the momentary intervals in which the signaling line to the data source 102 is returned to ground potential.

The closure of the contacts 287*a* directly energizes the winding 205 of the connecting relay 200 and is also effective through the normally closed contacts 202 and similar contacts to energize one winding, such as the winding 215, on the connecting relays associated with all of the data handling units 108, 110. However, since the allotting means provided by the counter 230 and the magnetic control switches 240 has previously energized the second windings 206, 226 in only the group of connecting relays 200, 220 associated with the data receiving and storage unit 108, only the connecting relay 200 has both windings 205 and 206 energized. This operates the relay 200 to close the contacts 203 and 204 and to open the contacts 201 and 202. The opening of the contacts 201 and 202 disables the remaining connecting relays associated with the data source 102, and the closure of the contacts 203 connects the data source 102 to the input of the preselected data receiving and storage unit 108. The closure of the contacts 204 provides an operating signal for advancing the ring counter 230 a single step.

More specifically, when the contacts 204 are closed, negative potential from the closed contacts 287*a* is applied to the winding 244 of the magnetic switch 241. The flux field developed by the winding 244 opposes the flux field developed by the energized winding 243 and, thus, the switch 241 is released to open the contacts 242. The opening of the contacts 242 opens the energizing circuit for the windings 206, 226 in the column of relays associated with the seized data receiving and storage unit 108. The connecting relay 200 is not released inasmuch as the negative potential supplied through the closed contacts 287*a* continues to energize the winding 205, and the relay 200 is capable of being held in an operated condition by only one-half of the flux required to operate this relay. Thus, the connecting relay 200 is maintained operated to connect the data source 102 to the data receiving and storage unit 108, and the remainder of the connecting relays, such as the relay 220, in the group associated with the data receiving and storage unit 108 are positively disabled from being placed in an operated condition.

The negative potential provided to the closed contacts 204 is also forwarded through the closed contacts 257 and a pair of normally closed contacts 291*a* to the advance pulse input of the ring counter 230. This pulse is forwarded over the input circuit and through the closed contacts 272 and 263 to energize a winding 265 of a relay in a second stage of the counter 230. The relay controlled by the winding 265 is similar to that controlled by the winding 255 and includes two sealed reed switches providing two pairs of normally open contacts 266 and 267. Thus, when the winding 265 is energized, the contacts 266 and 267 are closed. The closure of the contacts 266 connects a winding 270 similar to the winding 260 in series with the winding 265. The winding 270 is not energized because negative potential is applied to both terminals thereof.

The potential forwarded through the closed contacts 291*a* is also applied to the winding 291 of the mercury switch providing the normally closed contacts 291*a*. After a brief period equal to the operate time of this switch, the energized winding 291 opens the contacts 291*a* to interrupt the above-described operating circuit for the winding 265. However, the winding 265 is now energized in series with the winding 270 with the contacts 266 and 267 remaining closed. The winding 270 controls four reed switches providing two normally closed pairs of contacts 272 and 274 and two normally open pairs of contacts 271 and 273. The closure of the contacts 273 and the opening of the contacts 272 disconnects the second stage of the ring counter 230 from the input circuit and connects this input circuit to the third stage of the counter. The closure of the contacts 271 completes the energizing circuit for the winding 247 in the magnetic switch 245 so that the contacts 246 are closed to complete a circuit for energizing one winding, such as the winding 216, in all of the connecting relays in the group associated with the next data receiving and storage unit 110. Thus, the unit 110 is now preassigned for use when the next calling condition is received.

The opening of the contacts 274 interrupts the energizing circuit for the windings 255 and 260 so that the contacts 256, 266, 261, 262 and 263 controlled thereby are restored to their normal conditions. The opening of the contacts 261 terminates the energization of the winding 243 but this does not affect the state of the switch 241 because this switch was previously released by the energization of the winding 244. The opening of the contacts 257 removes the negative potential supplied to the winding 291 through the closed contacts 287*a* and 204 so that the contacts 291*a* release and prepare this circuit for supplying an input pulse the next time that the allotted data handling unit has been assigned for use. The remaining contact operations produced by terminating the energization of the windings 255 and 260 merely restores the first stage of the counter to its normal condition.

Assuming that demands for data handling units are now received from the data sources within a short enough period of time that the ring counter 230 is advanced through the remainder of its cycle of operation, all of the available data receiving units are placed in use. When the last data handling unit allotted by the last stage of the ring counter 230 is placed in use, a negative potential is forwarded through the closed contacts 291*a* in the manner described above and through the closed contacts 272 and 262 to energize the winding 255. This results in the closure of the contacts 256 and 257. When the contacts 256 are closed, the above-described circuit for energizing the winding 260 in series with its winding 255 is prepared. The closure of the contacts 257 connects the negative potential still forwarded through the closed contacts 287*a* and 204 to the closed contacts 291*a* and the winding 291, thereby providing a supplementary source of negative potential to that provided by the connecting means associated with the last allotted data handling unit.

When the contacts 291*a* are opened, the windings 260 and 255 are energized in series with each other, and the contacts 261 and 263 are closed and the contacts 262 are opened as well as the holding contacts in the last stage of the ring counter 230. This releases the last stage of the counter to remove the negative potential applied to the winding 291 from this source. The winding 291 remains energized by the potential supplied through the closed contacts 204 since the data receiving and storage unit 108 is still in use. The closure of the contacts 261 again energizes the winding 243, but the energization of this winding is not effective to close the contacts 242 because of the continuing energization of the winding 244 by the potential supplied by the contacts 204. Thus, the right-hand windings, such as the windings 206 and 226, of the connecting relays associated with the busy data receiving and storage unit 108 cannot be energized when the ring counter 230 is operated to the position individual to this busy storage unit because the energized winding 244 prevents the actuation of the mercury switch 241 to close the contacts 242. If the windings 206, 226 of the connecting relays cannot be energized, incoming calls cannot seize the busy data handling unit 108.

After the connection between one of the data sources 102, 104 and one of the data handling units 108, 110 has been completed, the following three identical transmissions of the plural digit word or fire alarm box designation are transmitted to and utilized by the data handling unit. At the conclusion of the last transmission of the message or word, the data source 102 is returned to a normal condition, and the negative pulse trains previously applied to the output line are terminated. This removes the forward bias from the diode 280 so that, after the delay interval of the circuit 283, the winding 281 is no longer energized, and the contacts 281*a* are opened to stop the motor 282. The forward bias for the diode 288 is also removed, and the energization of the winding 287 terminates following the delay interval of the holding circuit 290. When the winding 287 is no longer energized, the contacts 287*a* and 287*b* are opened.

The opening of the contacts 287*b* interrupts the holding circuit for the winding 287, and the opening of the contacts 287*a* interrupts the holding circuit for the relay winding 205 so that the connecting relay 200 is released to open the contacts 203 and 204 and to close the contacts 201 and 202. The closure of the contacts 201 and 202 re-establishes the circuit for assigning the data source 102 to one of the plurality of data handling units 108 and 110, and the opening of the contacts 203 disconnects the data source 102 from the data handling unit 108 to permit its reassignment and subsequent use. The opening of the contacts 204 terminates the energization of the winding 244 in the magnetic switch means 241 and also the winding 291 of the advance pulse generating source for the ring counter 230. When the winding 244 is no longer energized, the flux generated by the energized winding 243 becomes effective to control the open or closed condition of the contacts 242. Thus, in the normal situation, the termination of the energization of the winding 244 merely aids in conditioning the allotting means including the counting ring 230 and the magnetic control switches 240 for operation.

However, in the special situation in which all of the data handling units 108, 110 are busy and in which the ring counter 230 has returned to its first stepping position as described above, the opening of the contacts 204 performs a number of additional functions. In the first place, when the contacts 204 terminate the energization of the winding 244, the flux generated by the winding 243 which has been maintained energized by the closed contacts 261 closes the contacts 242 so that the windings 206, 226 in the group of connecting relays 200, 220 individual to the now idle data handling unit 108 are energized to preassign this unit for use when the next call is received from one of the data sources. In addition, the opening of the contacts 204 terminates the energization of the winding 291 so that the contacts **291*a* again close. This conditions the pulse source provided by the winding 291 and the contacts 291*a* for advancing the counting ring 230 a single step when the unit 108** is seized and placed in use by the next calling data source.

*Data receiving and storing unit 108*

The data handling units 108, 110 (FIGS. 3 and 4) are selectively assigned to calling ones of the data sources or signaling lines 102, 104 and are effective to receive, translate, and store the first two transmissions of the fire box identification and to record the third received identification. The storage and translation of the first two transmissions is performed by the magnetic storage matrix 112 and the indicating means 118 under the control of the various timing circuits and the counting circuits 114 and 116.

The magnetic storage matrix 112 may be of any desired capacity and can comprise a 10 x 10 matrix having ten intersecting horizontal rows and vertical columns. The crosspoints in the matrix are provided by two sealed magnetic "reed" switches provided with a pair of operating windings and a holding winding. As an example, a crosspoint arbitrarily designated as "00" comprises a pair of operating windings 401 and 402, a holding winding 403, and a pair of sealed magnetic switches providing two pairs of normally open output contacts 404 and 405. One terminal of all three of the windings 401–403 is connected to a reference potential, such as ground, and the other terminal of the operating winding 401 is connected to the output of the first counting means 114 to provide a first coordinate input. The other terminal of the operating winding 402 is connected to the output of the second counting means 116 to provide a second coordinate input. The remaining operating windings of the remaining crosspoints in the storage matrix circuit 112 are similarly connected to the first and second coordinate inputs provided by the counting circuits 114 and 116.

The other terminal of the holding winding 403 is adapted to be connected to a negative 48 volt potential through the normally open contacts 404 so that when the contacts 404 and 405 are closed by concurrent energization of the operating windings 401 and 402, the closure of the contacts 404 energizes the holding winding 403 to maintain the contacts 404 and 405 in a closed condition regardless of the energized condition of the operating windings 401 and 402. The contacts 405 are adapted to provide an output and are connected between a source of negative potential and a suitable recording or display means in the assembly 118. In the illustrative circuit shown in FIG. 6, the contacts 405 are connected between the source of reference potential and a visible display means, such as a "Nixie" tube, to cause a visible display of the digit "1." In a similar manner, the remaining crosspoints in the uppermost horizontally extending row control the provision of a visible display of the designations "2"–"10" in the visible display means 406. The remaining horizontally extending rows of the magnetic storage matrix 112 are provided with suitable output or indicating means similar to the visible display means 406.

The first coordinate or vertical column input to the magnetic storage matrix 112 is controlled by the first counting circuit 114 which includes a plurality of counting stages 410 operable in sequence from left to right (FIG. 4). The construction and operation of the counting circuit 114 as well as the control modules 410 included therein are described in detail in the above-identified Deeg application. Briefly, when the counting circuit 114 is in a normal condition, the first operating signal or negative pulse is forwarded through a pair of normally closed contacts **414*a* to simultaneously energize three windings 412, 414, and 415, the first two through a diode 416. The winding 412 controls the operation of a first group of sealed magnetic switches, and the windings 414 and 415, which produce oppositely directed flux fields, control a second group of reed switches. Thus, the input pulse causes the operation of only the switches associated with the winding 412 and closes two pairs of contacts 412*a* and 412*b*. The closure of the contacts 412*a* completes a holding circuit for the windings 412 and 414 extending to a negative potential through a pair of normally closed contacts 417 controlled by the next highest order counting stage. The closure of the contacts 412*b* provides a negative potential to all of the operating windings similar to the winding 401 in the vertical column of crosspoints representing the digital value of the first stage 410** or "1."

When the negative-going pulse disappears, the energization of the winding 415 is terminated, and the group of sealed switches controlled by the windings 414 and 415 are now operated because of the continued energization of the winding 414. This opens the contact **414*a* and closes a pair of contacts 414*b*, among others, so that the first stage 410 is disconnected from the source of input pulses at the open contacts 414*a* and the second counting stage 410 is connected thereto through the closed contacts 414*b*. In this manner, each succeeding input pulse advances the counting circuit 414 a single step. The operation of the second stage 410 opens the contacts 417 so that the first stage 410 is released. In restoring, the first stage 410 opens the contacts 412*b* so that the first vertical column of operating windings including the winding 401 is no longer energized. The operation of the second stage 410** causes the energization of the corresponding windings in the column of crosspoints representing "2."

The second coordinate input to the storage matrix 112 is controlled by the counting circuit 116. This counting circuit comprises a plurality of individual control modules 420 providing a ten stage counter. The counting circuit 116 and the modules 420 are identical to the modules 410 in the counting circuit 114 and are the same as the circuit described in the above-identified Deeg application. Thus, each time that an operating signal is applied to the input stage 420 through a pair of normally closed contacts **424*a*, a winding 425 is directly energized and two additional windings 422 and 424 are indirectly energized through a diode 426. The windings 424 and 425 produce oppositely directed magnetic flux fields so that the sealed switches controlled by these windings are not operated when the input pulse is initially applied. However, the energization of the winding 422 closes a pair of contacts 422***a*. The closure of the contacts 422*a* completes a holding circuit for the windings 422 and 424 extending to negative battery through a pair of normally closed contacts 427 controlled by the next highest order counting stage 420.

The input pulse to the first stage 420 is also concurrently applied to one terminal of all of the opening windings 402 in the first row of the magnetic storage matrix 112. Thus, the windings 401 are first selectively energized by the counter 114, and the counter 116 then pulses the horizontal inputs to the windings 402 to operate and latch the selected crosspoint. When this input pulse disappears, only the winding 424 remains energized and the second group of switches in the input control module 420 are operated to close a plurality of contacts 424*b* and 424*c* and to open the contacts 424*a*, among others. The operations of the contacts 424*a* and 424*c* direct the next input pulse to the second stage 420 of the counter and disconnect the first stage from the pulse source. The closure of the contacts 424*b* directs the second pulse to the windings 402 in the second row of the matrix 112. On receipt of the second operating pulse, this pulse is concurrently applied to the second row of the matrix 112 through the closed contacts 424*b* and directed to the input of the second stage 420 through the closed contacts 424*c*. The operation of the second stage opens the contacts 427 so that the first stage 420 is released. When the first stage 420 is released, the contacts 424*b* are opened to permit the next operating signal to be applied to the third horizontal row in the storage matrix 112. In the normal condition of the system 100, both the counting circuits 114 and 116 are in their normal conditions.

FIGURE 5 of the drawings illustrates a typical plural digit word or message that is transmitted four times in succession by one of the data sources, such as the data source 102. The illustrated word comprises "3–3633–4" and is formed of a plurality of different duration code elements. The values of digits are represented by a number of negative-going 48 pulses having a nominal duration of 125 milliseconds which are normally spaced by intervals of 125 milliseconds in which the signaling line is at ground or its normal potential. A dash"—" is represented by a negative-going signal of a nominal 625 millisecond duration, and a series of pulses representing a digit that is not terminated by a dash is terminated by a digit complete code comprising a ground potential signal having a nominal duration of 375 milliseconds. The end of each transmission or word is represented by a negative pulse having a duration of 1875 milliseconds. These durations can be suitably varied in accordance with the desired signaling rate and the type of communication channel with which the system 100 is adapted for use.

In the illustrative example set forth above in which the signal source 102 is connected to the input to the data handling unit 108 by the closure of the contacts 203 (FIGS. 2 and 3), the first transmission of the plural digit word, part of which is lost in the time required by the allotter and line finder 106 to establish the connection, is applied to the input of the one-second timer 130 (FIG. 3) which provides an output signal at the end of each word. The timer 130 includes a pair of transistors 302 and 304. The transistor 302 is normally held in a conductive condition so that a capacitor 306 connected to the base of the base of the transistor 304 is charged to a negative potential. This negative potential holds the base of the transistor 304 negative with respect to its emitter so that the transistor 304 is normally in a nonconductive state.

The base of the transistor 302 is connected to the input signaling line through the closed contacts 203 and a diode 308 so that the negative-going pulses forming the transmitted material are applied to the base of the transistor 302 and momentarily drive the base negative with respect to its emitter. This periodically terminates conduction through the transistor 302. During these intervals, the charge on the capacitor 306 tends to discharge through a shunting resistor 310. However, the intervening periods in which the transistor 302 is in a conductive state are normally sufficient to maintain the charge on the capacitor 306. However, when the end-of-word code is transmitted, the capacitor 302 is maintained in a nonconductive condition for a relatively long period of time so that the charge on the capacitor 306 leaks off through the resistance 310. When the charge is reduced to the point at which the base of the transistor 304 becomes positive with respect to its emitter electrode, the transistor 304 is placed in a conductive condition to complete an energizing circuit for a winding 312 of a sealed mercury switch having a pair of normally open contacts 312*a*. A capacitor 314 is shunted across the winding 312 to reduce oscillatory signals.

When the contacts 312*a* are closed, an operating circuit for a winding 316 of a second sealed mercury switch is completed. When the winding 316 is energized, two pairs of normally closed contacts 316*a* and 316*b* are opened. The opening of the contacts 316*b* disables the timer 124 at the end of each transmitted word. The winding 316 is shunted by a diode 318 that tends to make the switch controlled by the winding 316 slow-to-release.

The negative potential provided at the closed contacts 312*a* is also forwarded to the three step counter 120. This counting circuit includes four modules 320–323 which are identical to and are connected in the same manner as the modules in the counting circuits 114 and 116 to provide a four-stage counter. Thus, the negative potential provided by the closed contacts 312*a* is forwarded through contacts controlled by the modules 320, 321 and 322 to energize and partially operate the module 320.

After the end-of-word code when the signaling line returns to ground potential, the transistor 302 is again placed in a conductive condition and the capacitor 306 charges to terminate conduction through the transistor 304. This interrupts the energization of the winding 312 so that the contacts 312*a* are opened to interrupt the energizing circuit for the winding 316 and to remove potential from the input of the counting circuit 120 as well as other circuits in the data handling unit 108. The contacts 316*a* controlled by the winding 316 do not close at this time because of the slow-to-release characteristic imparted by the shunting diode 318. However, the removal of the potential from the input to the counting circuit 120 completes the operation of the first stage 320 so that a pair of contacts 320*a* are closed. This connects the input line from the closed contacts 203 over a pulsing circuit extending to the input of the first counter 114 and to the inputs of the timing circuits 124 and 126. Thus, the receipt of the end-of-word code at the end of the first transmission of the fire box identification connects the signaling line 102 to the counting circuit 114 and the timing circuits 124 and 126.

In addition, the holding potential for the second counter 116 is normally supplied through the normally closed contacts 316*a* or through a diode 324 in the interval after the contacts 316*a* have opened and the contacts 312*a* have closed. However, in the interval following the opening of the contacts 312*a* and prior to the closure of the contacts 316*a*, all negative potential is disconnected from the holding circuit for the counter 116, and this counter restores to its normal condition in which the first horizonally extending row of the storage matrix 112 is adapted to receive an operating signal. After the delay interval, the current flow through the winding 316 is terminated so that the contacts 316*a* reclose to apply a negative holding potential to the counting circuit 116. The data handling unit 108 is now in a condition to receive the second transmitted series of pulses.

As illustrated in FIG. 5 of the drawings, the first digit "3" is transmitted by three negative-going pulses which are forwarded through the closed contacts 320a to the input of the counter 114. These pulses advance the counter 114 to its third position representing the input digit "3" and energize the ten operating windings 401 in the third vertically extending column in the storage matrix 112. The counter 114 is advanced through these three steps even though the negative potential forming the third input pulse becomes extended to form the dash code and is not terminated inasmuch as the first coordinate input signals to the matrix 112 are provided by switches controlled by the winding 412 in the module 410, for instance, which operate upon receipt of the input signal and not upon removal thereof.

Since the next item of information in the message comprises a dash represented by the application of the negative potential to the line for a period on the order of 625 milliseconds, the dash timing circuit 126 is used to translate the width of this signal into a control signal for the data handling unit 108. More specifically, the negative potential provided at the closed contacts 320a is applied to the input of the timing circuit 126 through an input diode 326. The timer 126 includes a normally conductive transistor 328 through which a capacitor 330 is normally charged to a high enough negative potential that the base of a second transistor 332 is held at a potential that is negative with respect to its emitter electrode. Thus, the transistor 332 is normally in a nonconductive state. Whenever a negative signal is applied through the diode 326 to the base of the transistor 328, this transistor is placed in a nonconductive condition, and the charge on the capacitor 330 leaks off or is discharged through a resistance element 334. Thus, the charge on the capacitor 330 is intermittently discharged whenever negative-going signals are transmitted to the data handling unit 108.

If the transistor 328 is maintained in a nonconductive condition for an interval on the order of 625 milliseconds, the length of the dash code, the charge on the capacitor 330 becomes dissipated to the point at which the transistor 332 is placed in a conductive condition to energize a winding 336 of a sealed mercury switch, the winding 336 being shunted by a damping capacitor 338. The energization of the winding 336 closes a pair of normally open contacts 336a and opens a pair of normally closed contacts 336b. The closure of the contacts 336a completes an energizing circuit for a winding 340 shunted by a diode 342 which serves to retard the decay of current through the winding 340. When the winding 340 is energized, a sealed mercury switch is actuated to close a pair of normally open contacts 340a. The timer 126 remains in this condition until the end of the code representing the dash. At this time, the signal line returns to ground potential, and the forward bias for the diode 326 is removed so that the transistor 320 returns to a conductive condition. This places a more negative potential on the base of the transistor 332 to terminate conduction through this transistor and through the winding 336. This opens the contacts 336a and closes the contacts 336b.

Although the opening of the contacts 336a interrupts the energizing circuit for the winding 340, the contacts 340a controlled by this winding do not immediately open because of the delay introduced by the shunting diode 342. Thus, the closure of the contacts 336b and the continued closed condition of the contacts 340a completes a circuit for forwarding a negative-going pulse to the terminals of all of the windings 402 in the first horizontally extending row in the storage matrix 112. Since the third vertical column of windings 401 is energized by the counting circuit 114, the third crosspoint in the first row is operated to close the corresponding contacts 404 and 405. This provides an output display in the indicating means 118 representing the received digit "3" and closes the corresponding contacts 404 to energize the corresponding holding winding 403 to retain the crosspoint in its closed condition. The negative-going pulse provided by the contacts 336b and 340a also provides an input to the counter 116 to partially operate the first counting stage 420 therein.

The negative potential provided by the closed contacts 336b and 340a is also forwarded to the reset circuit 128 and, more specifically, energizes a winding 344 of a mercury switch including a pair of normally open contacts 344a and a pair of normally closed contacts 344b. The energization of the winding 344 closes the contacts 344a and opens the contacts 344b. The closure of the contacts 344a completes an energizing circuit for a winding 346 of another sealed mercury switch which operates to open a pair of normally closed contacts 346a. The opening of the contacts 344b and 346a interrupts the connection between the source of negative potential and the holding circuit for the first counter 114. However, the closure of the contacts 344a completes a circuit extending through a diode 348 for maintaining continuity in the negative potential supply to the holding circuit of the counter 114 so that it is not restored to its normal condition.

At the end of the delay interval of the switch including the winding 340, the contacts 340a are opened to terminate the negative-going output pulse from the timer 126. This permits the full operation of the first counter stage 420 in the counter 116 to close the contacts 424b so that a circuit is prepared for energizing the windings 402 in the crosspoints in the second row of the magnetic storage matrix 112. The termination of this negative-going pulse also terminates the energization of the windings 402 in the first row of the matrix 112, but this is without effect on the matrix because the holding circuit for the closed crosspoint has previously been completed.

The termination of the negative-going pulse at the output of the timer 126 also terminates the energization of the winding 344 so that the contacts 344a are opened and the contacts 344b are closed. The opening of the contacts 344a terminates the application of the negative holding potential through the diode 348 to the first counting circuit 114 so that this circuit is restored to its normal condition. The opening of the contacts 344a also interrupts the energizing circuit for the winding 346 but this winding remains sufficiently energized because of a shunting diode 350 so that a time delay period ensues before the contacts 346a are closed. When the contacts 346a are closed, the prior closure of the contacts 344b completes the circuit for again supplying the holding potential to the counting circuit 114 to permit its operation during the next series of pulses transmitted from the data source 102.

As illustrated in FIG. 5 of the drawings, the next item transmitted from the data source 102 is a digit complete code that indicates the prior item, e.g. the dash, has been transmitted. This code consists of maintaining the line in a normal or ground condition for a period of around 375 milliseconds. This code is detected by the timer or detecting circuit 124 which is connected to the signaling line through the closed contacts 320a and 316b and a diode 352. The detector or timing circuit 124 includes a transistor 354 whose emitter electrode is held at a negative potential by a voltage dividing network connected between ground and the source of negative potential. The base electrode of the transistor 354 is normally held at ground potential when the signal transmission is not present. However, when the contacts 320a are closed, the first negative-going pulses are received from the data unit 102. These pulses are forwarded through the diode 352 and charge a capacitor 356 so that the base of the transistor 354 is driven negative with respect to its emitter so that this transistor conducts to energize a winding 358 of a mercury switch. When the winding 358 is energized, a pair of contacts 358a are closed and a pair of contacts 358b are opened. The closure of the contacts 358a energizes a winding 360 of another mercury switch so that a pair of contacts 360a are closed. The winding 360 is also shunted by a delay diode 362. Thus, during the interval in which negative signaling pulses are received from the line, the transistor 354 is maintained in a conductive condition.

However, when the line returns to a normal or ground condition for a period having a nominal duration of 375 milliseconds, the diode 352 is reversed biased and the charge on the capacitor 356 leaks off through a shunting resistance element 364. Thus, the transistor 354 is placed in a nonconductive condition to terminate the energization of the winding 358. This releases the mercury switch to close the contacts **358*b* and to open the contacts 358*a*. The opening of the contacts 358*a* terminates the direct energization of the winding 360, but the shunting diode 362 retards the complete decay of current through the winding 360 for a sufficient period that the contacts 360*a* remain momentarily closed until after the contacts 358*b* have been closed. Thus, a negative-going potential is provided at the output of the digit or item complete detector 124. This negative-going pulse is used in the same manner as the negative-going pulse from the output of the timing circuit 126. In other words, this output pulse is forwarded through the closed contacts 424*b*, for instance, to the second row of crosspoints in the storage matrix 112. Since, however, the first counting means 114 has not been operated to a setting in which one of the windings 401 controlled thereby is energized, a crosspoint in the second horizontal row is not energized. This provides a representation that the transmitted information was a space or dash. The pulse from the output of the detector 124 also advances the second counting circuit 116 a single step so that the contacts 424*b* are opened and the corresponding contacts associated with the windings 402 in the third horizontal row of the matrix 112 are closed. The pulse is also applied to the reset control 128 so that the counting circuit 114** is again reset to a normal condition even though this circuit has not previously been operated.

The remaining digits and items of control information forming the second transmission of the plural digit word or fire box designation are then stored in the manner described above with the values of digits being successively stored in the first counting means 114 and registered in different horizontally extending rows of the matrix 112 under the control of the second counting means 116. Thus, at the end of a cycle of transmission, the word transmitted from the data source 102 is stored in the first eight horizontally extending rows of the magnetic storage matrix 112 to produce a corresponding visual display in the indicating means 118 under the control of the closed and latched crosspoints in the matrix 112. The end-of-word code following the second complete transmission controls the detector 130 in the manner described above to reset the second counter 116 and to advance the counter 120 an additional step so that the first stage 320 of this counter is reset and the second stage 321 is operated. Thus, the contacts **320*a* are opened and a pair of contacts 321*a* controlled by the second stage 321 of the counter 120 are closed to again connect the signaling line to the detectors 124 and 126 and to the input of the first counting circuit 114**.

The third transmission of the word from the data source 102 is then performed in the manner described above so that this entry is stored in the matrix 112 to produce the selective illumination of the display means in the indicating assembly 118. Inasmuch as the crosspoints closed during the second transmission remain closed, the second and third transmissions of the data message are concurrently stored in the matrix 112. If the received messages during the second and third transmissions are identical, the indicating means 118 displays only a single digit in each of the individual display means 406. Alternatively, if the second and third transmissions are not identical, more than a single digit representing lamp is illuminated in the display means 118 in one or more of the horizontal rows of the matrix 112. Thus, an indication is provided that an erroneous transmission has occurred.

When the end-of-word code following the third transmission has been received by the detector 130, a negative-going pulse is again provided to the counter 120 to advance this counter to release the second stage 321 and to operate the third stage 322. This opens the contacts **321*a* and closes a pair of contacts 322*a*. Thus, the signaling line connected to the closed contacts 203 is now connected through the closed contacts 322*a* to the recorder 122 and is disconnected from the storage matrix and the plurality of timing and detecting circuits. The output signal from the timer 130 also resets the counter 116 to its normal position. Thus, the fourth transmitted message is recorded in the recorder 122** to provide a permanent record.

When the data transmission is completed, the allotter and line finder 106 is released by the calling data source 102 and the closed contacts on the connecting relay, such as the contacts 203 on the relay 200, are opened to disconnect the data source and the selected data handling unit 108. The data handling unit 108 is now in a normal condition except for the presence of the locked crosspoints in the storage matrix 112. After the data source 102 has been released by the allotter and line finder 106, the data handling unit 102 can be reset to a normal condition by actuating a manual reset button 370 to remove the negative operating potential from the unit 108. This resets the counter 120 to its normal condition and releases all of the actuated crosspoints in the matrix 112 as well as in the indicating means in the assembly 118. Thus, the system 100 is now restored to a normal condition.

Alternatively, in some applications it is desirable to automatically reset the data handling unit 108 to its normal condition in response to the completion of the fourth transmission of the plural digit word from the unit 102 and prior to or concurrently with the release of the calling data source 102. This can be accomplished by providing a fourth stage 323 in the counter 120 which is operated by the end-of-word detector 130 at the termination of the fourth transmission which is recorded by the recorder 122. This output signal restores the third stage 322 to its normal condition in which the contacts **322*a* are opened to disconnect the recorder 122 and operates the fourth stage 323 so that a pair of normally open contacts 323*a* are closed to complete an energizing circuit for a winding 372 of a pair of sealed switches providing two pairs of normally closed contacts 372*a* and 372*b*. The winding 372 is shunted by a diode 374 which delays the release of the switches controlled by the winding 372. When the winding 372 is energized, the contacts 372*a* and 372*b*** are opened.

The opening of the contacts **372*a* removes operating potential from the matrix 112 so that the closed crosspoints are released. The opening of the contacts 372*b* removes holding potential from the counter 120 so that the stage 323 is restored to a normal condition, the stages 320–322 having previously been restored. When the counter stage 323 restores, the contacts 323*a* are opened to terminate the energization of the winding 372. However, the collapse of the flux field previously developed by the winding 372 is effective to develop a current through the shunting diode 374 for maintaining the winding energized for a period following the opening of the contacts 323*a*. This maintains the contacts 372*a* and 372*b* open for a brief instant to insure the complete resetting of the counter stage 323 and of the matrix 112. When sufficient current no longer flows through the winding 372, the contacts 372*a* and 372*b* are closed to restore the data handling unit 108** to its normal condition.

Although the present invention has been described with reference to only a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. In a data handling system for connecting input lines to idle output lines, a ring counter operable to settings representing different output lines, a plurality of switch means each individual to one of the output lines and each including a pair of windings, a first one of the windings in each pair being capable of operating the switch means and the second of the windings being capable of preventing operation of the switch means, a plurality of connecting means controlled by the switch means for connecting input lines to output lines, means controlled by the ring counter for controlling the energization of the first winding in the switch means, and means controlled by the connecting means for controlling the energization of the second windings to mark the used connecting means as busy.

2. A data handling system comprising a plurality of signal receiving means, a signal source, a plurality of connecting means for connecting the signal source to an idle one of the plurality of signal receiving means, each of the connecting means including relay means having a pair of windings, allotting means for rendering different ones of the connecting means effective to connect the signal source to an idle one of the signal receiving means, said allotting means including means for selectively energizing one of the windings of the relay means, and means for energizing the other winding of the relay means to operate the relay means when the connecting means is to connect the signal source to the idle signal receiving means.

3. The system set forth in claim 2 in which the relay means has the characteristic of requiring the energization of both of the windings when the relay means is to be operated and of requiring the energization of only one one of the windings to hold the relay means operated, and which includes means controlled by the operation of the connecting means for controlling the allotting means to remove the energization from the said one winding of the relay means.

4. A data handling system comprising a plurality of signal receiving means, a signal source, a plurality of connecting means for connecting the signal source to an idle one of the plurality of signal receiving means, each of the connecting means including relay means having a pair of windings, allotting means for rendering different ones of the connecting means effective to connect the signal source to an idle one of the signal receiving means, said allotting means including magnetic switch means individual to each of the connecting means and each including first and second windings, said first winding being energized in sequence to operate the magnetic switch means in sequence, means controlled by the magnetic switch means for energizing one winding of the relay means in the selected connecting means, means for energizing the other winding of the relay means when the signal source is to be connected to the signal receiving means by the operation of the selected connecting means, and means controlled by the operation of the connecting means for energizing the second winding of the related magnetic switch means to prevent this magnetic switch means from energizing the said one winding of the relay means in the operated connecting means.

5. In a data handling system, data sources and data receivers adapted to be selectively interconnected, a plurality of connecting means each operable to connect a data source to a data receiver, allotting means for rendering idle ones of the connecting means effective in sequence, said allotting means including a plurality of switching means each having first and second windings, counting means for sequentially energizing the first windings of the switching means, the energization of the first winding operating the associated switching means to allot the associated connecting means, and control means connected to the second winding and controlled by the operated and released condition of the connecting means for energizing the second windings in accordance with the idle or busy condition of the connecting means to inhibit the operation of the switching means when the connecting means are busy.

6. In a data handling system, input and output lines adapted to be selectively interconnected, a plurality of connecting means each operable to connect an input line to an output line, and an allotting means coupled to the connecting means for rendering idle ones of the connecting means effective in sequence, said allotting means including a plurality of switching means each having a first winding energized in a fixed sequence and a second winding selectively energized in accordance with the idle or busy condition of the selected connecting means, the switching means being operated to allot a connecting means in response to energization of the first winding and its operation being inhibited by the energization of the second winding.

7. In a data handling system including an input line that is to be connected to an idle one of a plurality of output lines, a plurality of relay means common to the input line and each individual to one of the output lines, each of said relay means including contacts for connecting the common input lines to the individually associated output lines and a pair of windings which must be concurrently energized to operate the contacts, means for selectively energizing one of the windings in the relay means under the control of the input line, counting means operable to different settings representing an idle one of the output lines, and means controlled by the counting means for selectively energizing the other winding of one of the relay means corresponding to an idle output line to operate the one relay means.

8. A data handling system comprising a plurality of data utilizing means normally in an idle condition and adapted to be placed in a busy condition when in use, an assigning means for assigning the data utilizing means for use, a plurality of switch means in the assigning means each associated with one of the data utilizing means and each including a pair of windings, counting means for sequentially energizing one of the windings in the switch means as the different data utilizing means are assigned for use, the energization of one of the windings operating the switch means to assign the associated data utilizing means for use, and means for selectively energizing the other windings of the switch means in accordance with the idle and busy conditions of the data utilizing means for preventing the assignment of a busy data utilizing means, the energization of said other winding inhibiting the operation of the switch means.

9. A data handling system comprising a plurality of data utilizing means normally in an idle condition and adapted to be placed in a busy condition when in use, an assigning means for assigning the data utilizing means for use, a plurality of sealed magnetic switch means each individual to one of the data utilizing means, each of said switch means including a pair of winding means for applying oppositely directed flux fields to the switch means, means for energizing one of the windings of the switch means individual to a given data utilizing means to operate the switch means and place the utilizing means in use, and means for selectively energizing the other windings of the switch means when the related data utilizing means is in a busy condition, the energization of the other winding of the switch means preventing the operation of the switch means.

10. A data handling system for determining and indicating the idle or busy condition of a plurality of data handling units, which system comprises a plurality of magnetic switch means each individual to one of the data units and each having a pair of windings for applying oppositely directed flux fields to the magnetic switch means, means for selectively energizing one of the windings on all of the magnetic switch means in accordance with the idle or busy condition of the related data handling unit, and means for sequentially energizing the other windings of all of the magnetic switch means so that the operated or released condition of the magnetic switch means provides an indication of the idle and busy condition of the data handling units, each switch means being operated by the energization of its other winding and being released when its one winding is energized or its one and other windings are energized.

References Cited

UNITED STATES PATENTS

| | | | |
|---|---|---|---|
| 3,061,192 | 10/1962 | Terzian | 235—157 |
| 3,226,687 | 12/1965 | Amdahl et al. | 340—172.5 |
| 3,244,942 | 4/1966 | Deeg | 317—137 |

ROBERT C. BAILEY, *Primary Examiner.*

I. S. KAVRUKOV, *Assistant Examiner.*